March 25, 1924.
L. STURGES ET AL
1,487,899
MACHINE FOR EMBOSSING ARTICLES
Filed April 9, 1923
5 Sheets-Sheet 2
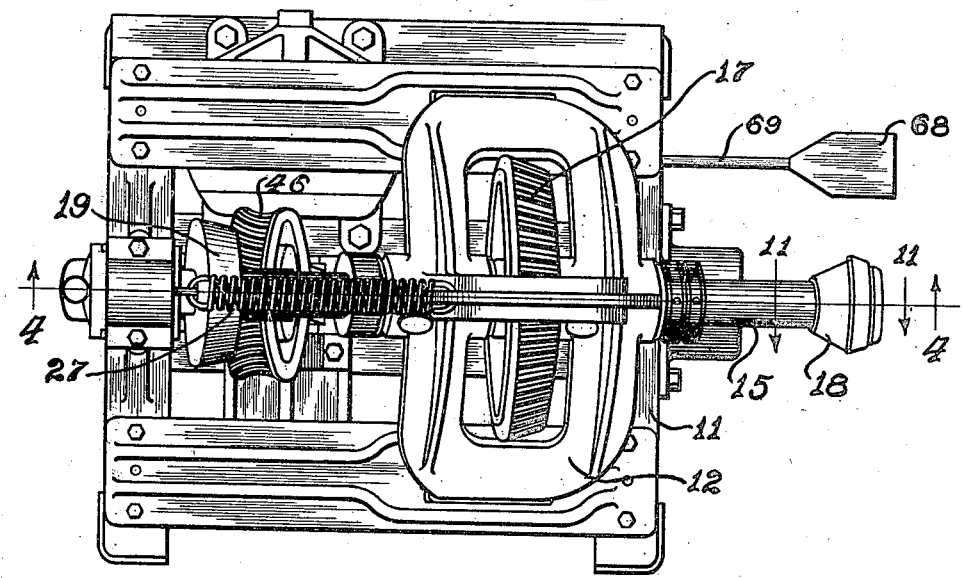
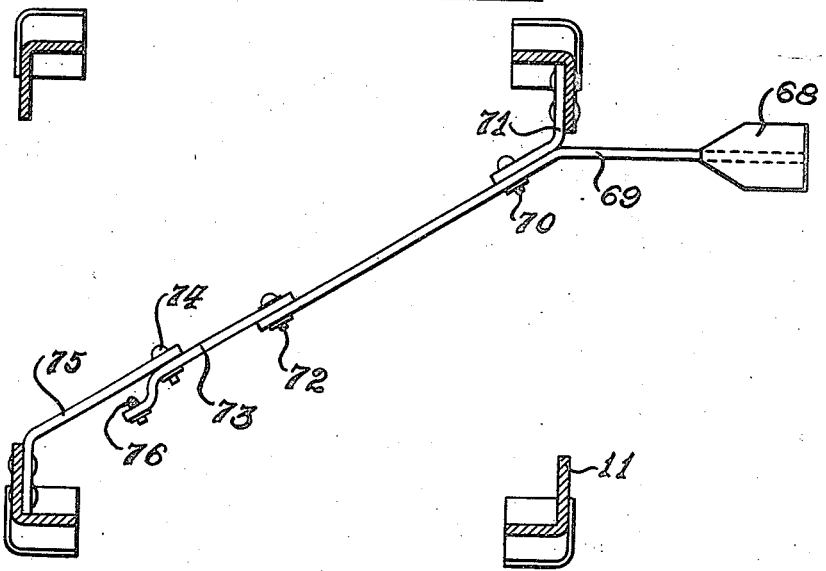

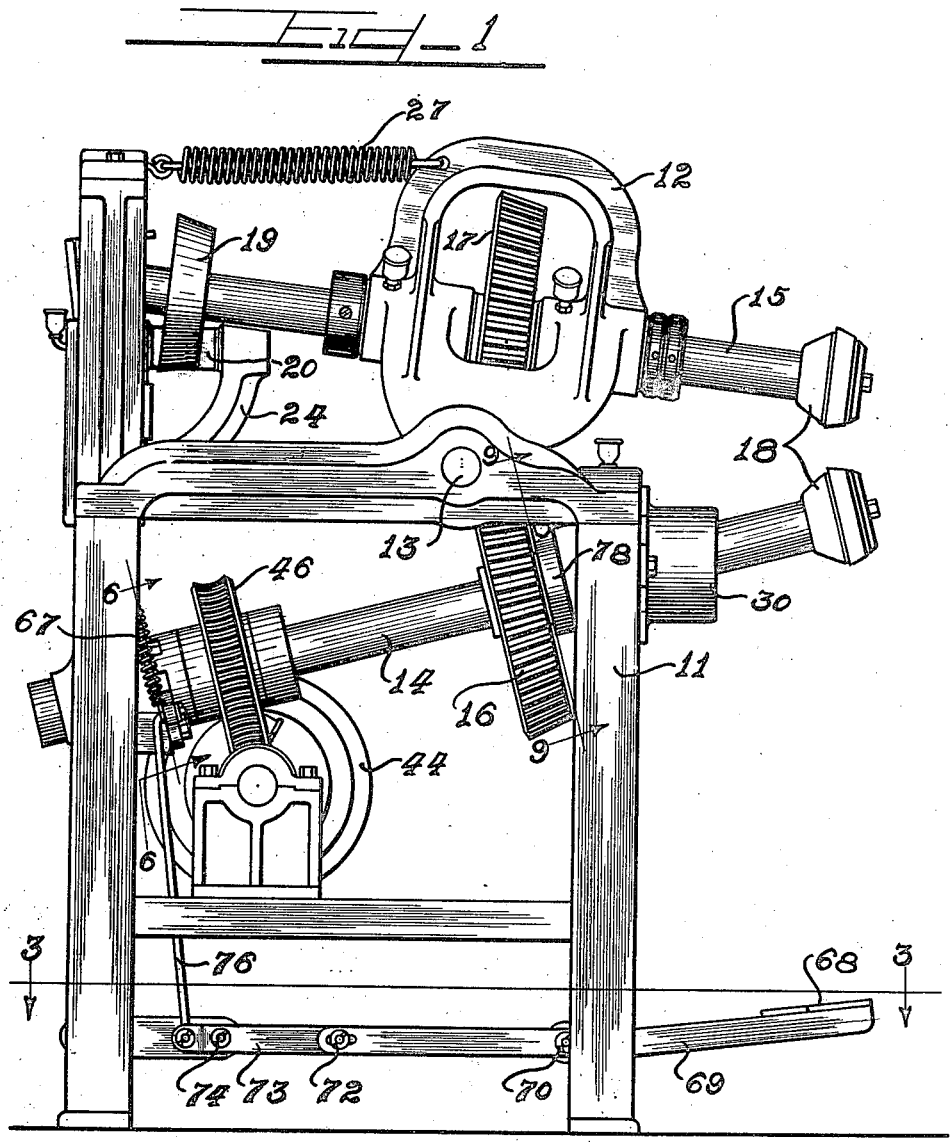

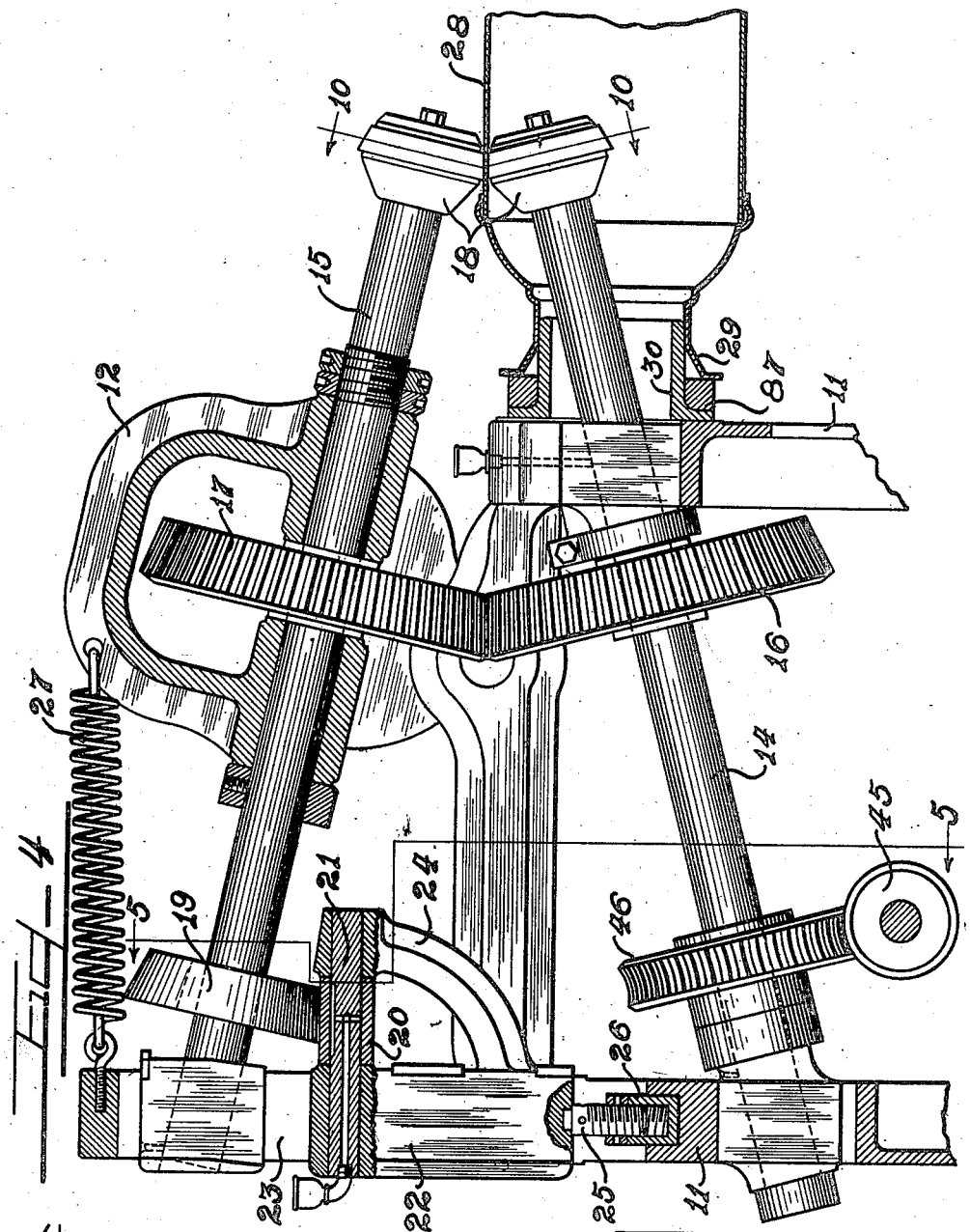

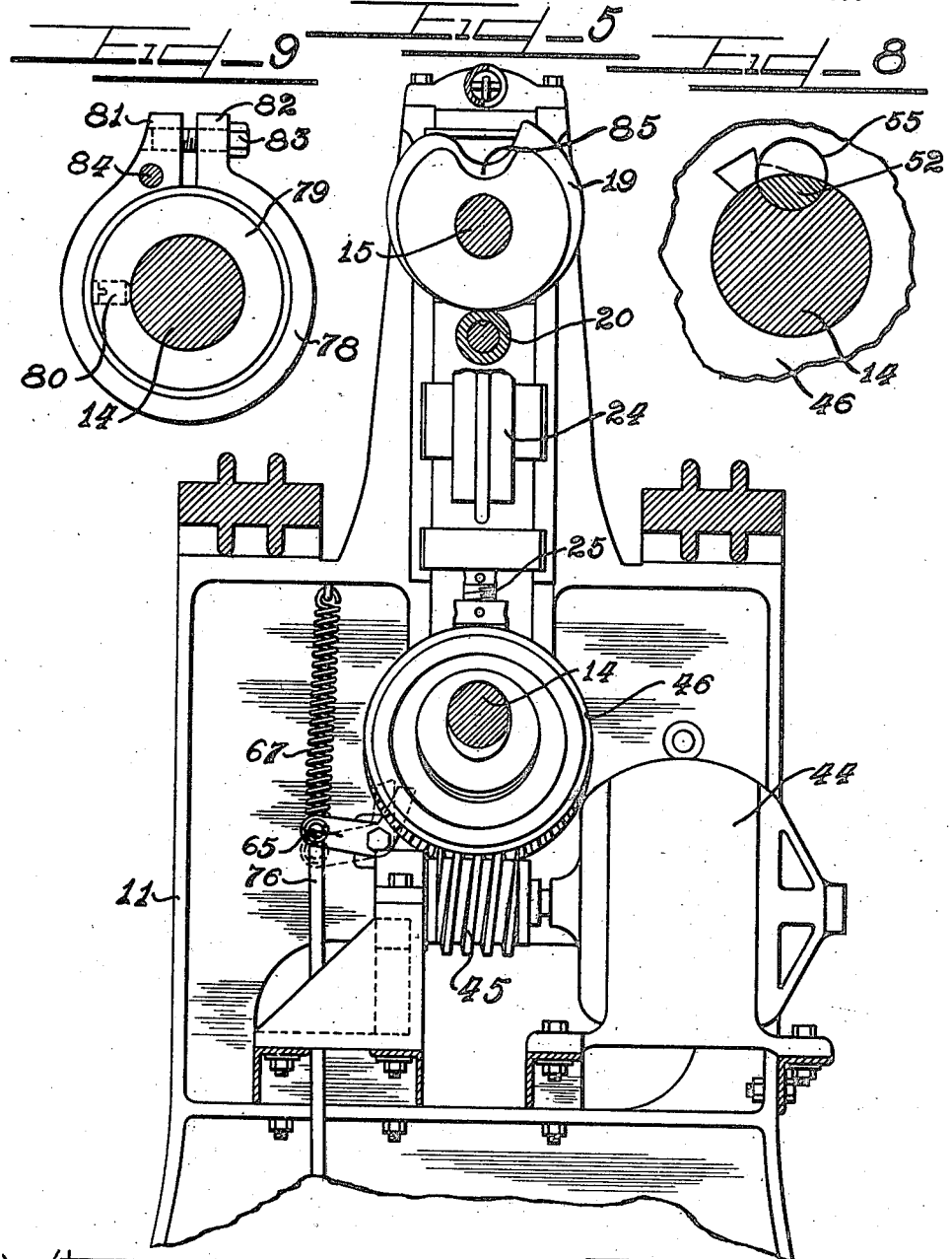

March 25, 1924.
L. STURGES ET AL
1,487,899
MACHINE FOR EMBOSSING ARTICLES
Filed April 9, 1923     5 Sheets-Sheet 5
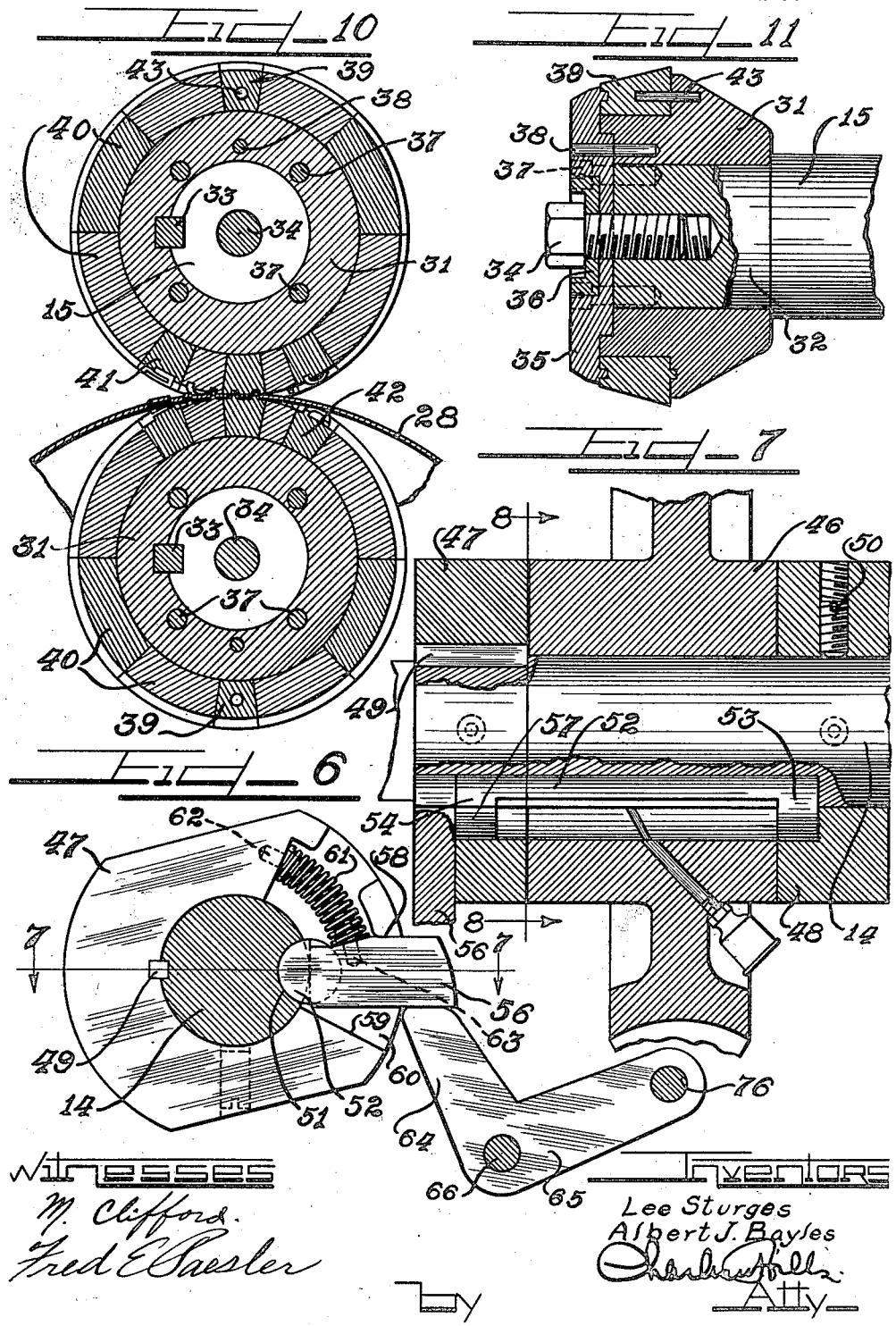
Witnesses
M. Clifford.
Fred E. Paesler
Inventors
Lee Sturges
Albert J. Bayles
by Charles Hill
Atty.

Patented Mar. 25, 1924.

1,487,899

UNITED STATES PATENT OFFICE.

LEE STURGES, OF ELMHURST, AND ALBERT J. BAYLES, OF MELROSE PARK, ILLINOIS, ASSIGNORS TO SOLAR-STURGES MANUFACTURING COMPANY, OF CHICAGO, ILLINOIS, A CORPORATION OF ILLINOIS.

MACHINE FOR EMBOSSING ARTICLES.

Application filed April 9, 1923. Serial No. 630,834.

*To all whom it may concern:*

Be it known that we, LEE STURGES and ALBERT J. BAYLES, both citizens of the United States, and residents, respectively, of Elmhurst, in the county of Cook and State of Illinois, and Melrose Park, in the county of Cook and State of Illinois, have invented certain new and useful Improvements in a Machine for Embossing Articles; and we do hereby declare that the following is a full, clear, and exact description of the same, reference being had to the accompanying drawings, and to the numerals of reference marked thereon, which form a part of this specification.

This invention relates to machines for embossing articles, and, although not restricted to such use, is designed more particularly for embossing the owner's name on milk cans.

It is an object, therefore, of the present invention to provide a machine for embossing a name or device upon a can already manufactured.

A further object is to provide a machine adapted to emboss a plurality of lines of lettering upon a can or the like.

It is also an object of the invention to provide a machine for embossing names or devices upon a curved surface.

It is also an object of the invention to provide an embossing machine adapted to use type blocks so that by changing and selecting these blocks any desired name or word may be embossed upon an article.

An additional object is the provision of means for imparting merely a single rotation to the embossing rolls and then separating the rolls to allow the article operated upon to be removed.

A further object of the invention is to bring the embossing rolls into and out of action automatically.

A further object of the invention is to enable the body of cans or the like having narrow mouths to be operated upon.

Other and further important objects of this invention will be apparent from the disclosures in the specification and the accompanying drawings.

The invention (in a preferred form) is illustrated in the drawings and hereinafter more fully described.

On the drawings:

Figure 1 is a side elevation of a machine embodying the present improvements.

Figure 2 is a plan view of the machine.

Figure 3 is a section on the line 3—3 of Figure 1.

Figure 4 is a section on the line 4—4 of Figure 2.

Figure 5 is a section on the line 5—5 of Figure 4.

Figure 6 is a section on the line 6—6 of Figure 1.

Figure 7 is a section on the line 7—7 of Figure 6.

Figure 8 is a section on the line 8—8 of Figure 7.

Figure 9 is a section on the line 9—9 of Figure 1.

Figure 10 is a section on the line 10—10 of Fig. 4.

Figure 11 is a section on the line 11—11 of Fig. 2.

As shown on the drawings:

The machine comprises a main frame 11 to which a second frame 12 is pivotally connected at 13. In the first frame is journalled a shaft 14, while a similar shaft 15 is journalled in the upper frame.

On these shafts gears 16 and 17 are arranged which mesh with each other so that the shafts rotate in unison, though in opposite directions. These gears are so arranged that the axis of the pivot 13 about which the upper frame 12 swings is tangent to the pitch circles of both gears so that the gears remain in mesh in any position of the frame.

At the converging ends of the shafts 14 and 15 embossing heads 18 are provided and by swinging the upper frame 12 about its pivot 13 the heads may be brought together and then separated as desired. This movement may conveniently be brought about by a cam 19 on the upper shaft 15, the periphery of which engages with a roller 20 and is formed with a recessed or depressed portion 85.

This roller is mounted on a stationary shaft 21 supported at one end by a block 22 slidably mounted on an upright 23 of the lower frame 11 and at the other end by a bracket 24 attached to the same block. The position of this sliding block may be adjusted by means of a screw 25 working in a socket 26 arranged in a recess in the frame 11.

For holding the cam 19 in contact with the roller 20 while the roll is moving upwardly, a spring 27 is provided connected at one end to the upright and at the other end to the frame 12.

The arrangement of the embossing heads 18 to each other and to the article 28 to be operated on is clearly shown in Figure 4. The article illustrated is a milk can having a restricted mouth 29. If the shaft 14 was inserted into the can parallel to its sides, the embossing head could not be made large enough to enable it to touch the sides, since its diameter is limited by the inside diameter of the mouth of the can or of its support 30. Accordingly the shaft is inclined to the axis of the can and the operative surface of the embossing heads are made conical in form. As shown, the can is arranged horizontally and both shafts are inclined, the lower one upwardly and the upper one downwardly. This is not essential, however, the only requisite being that the cones formed by the embossing heads and pitch circles of the gears should be tangential with respect to the cylindrical body of the can.

In order to be able to adjust the position of the can relatively to its supports, one or more washers or spacing rings 87 may be arranged on the support 30. By this means more than one line of lettering may be embossed on the can.

The construction of the embossing heads 18 is shown more particularly in Figures 10 and 11. Each head comprises an annular ring 31 arranged upon a reduced portion 32 of its shaft 14 or 15. This ring is prevented from turning relatively to the shaft by means of a key 33 and is held in place longitudinally of the shaft by a bolt 34 threaded into an aperture in the end of the shaft. Between the head of this bolt and the ring 31 is arranged a cap 35 and washer 36. The cap 35 is not only held against the ring 31 by the bolt 34, but is also secured thereto by bolts 37. A pin 38 secured to the cap 35 and adapted to enter a hole in the ring 31 serves to ensure that the parts register when brought together.

The ring 31 is recessed around its periphery for the reception of a series of blocks 39, 40 and 41, which form the operative surface of the embossing heads. The blocks 41 are formed with recesses on their outer surface adapted to register with projections in the form of letters on the corresponding blocks 42 of the other embossing head. The purpose of the block 39 is to position correctly the other blocks and to accomplish this function this block is provided with a projecting pin 43 adapted to enter a hole in the ring 31. Blocks 40 are merely used as spacers or fillers between the letter blocks 41 and the aligning block 39. These blocks 39, 40, 41 and 42 are tongued and grooved for engagement with the ring 31 and cap 35.

The machine is driven by any suitable source of power, such as an electric motor 44. On the shaft of this motor is a worm 45 in mesh with a worm wheel 46 rotatably mounted on the shaft 14 between collars 47 and 48. The collar 47 is secured to the shaft 14 by means of a key 49. A set screw 50 secures the collar 48 to the shaft 14. In the shaft 14 is a semicircular groove 51 for the reception of a member 52. This member has a cylindrical head 53 journalled partly in this groove 51 and partly in a recess in the collar 48. At its other end 54 the member is half-round and adapted to turn in the groove 51 of the shaft and a semi-circular recess in the collar 47. Intermediate the portions 53 and 54 the member 52 is formed so that in the position shown in Figures 6 and 7 it exactly fills the space previously occupied by the metal removed to form the groove 51 in the shaft. In this position the worm wheel 46 is free to rotate about the shaft 14.

The bore of the worm-wheel 46 is formed with a semi-cylindrical groove 55 (Figure 8) which allows the member 52 to rotate in one position of the worm-wheel relative to the shaft 14. If such rotation takes place, so that the parts assume the position shown in dotted lines, the edge of the member 52 engages one side of the groove 55 and compels the worm-wheel to rotate the shaft 14 on which it is mounted until the member 52 is returned to its original position.

For operating this member a latch 56 is provided having a lateral half-round projection 57 adapted to overlap the half-round end 54 of the member 52 so that oscillatory movements of the latch 56 are communicated to the member 52. This latch is arranged so that it may oscillate between shoulders 58 and 59 on each side of the recess 60 in the collar 47 in which it is mounted. When the latch is in contact with the shoulder 58, the worm-wheel 46 is free to rotate on the shaft 14, and when in contact with shoulder 59 the worm-wheel is operatively connected to the shaft. A spring 61 is arranged in a recess in the collar 47 adapted yieldingly to hold the latch in contact with the shoulder 59. This spring is held in place by pins 62 and 63 which enter its opposite ends.

In the path of the latch 56 is arranged one arm 64 of a bell-crank 65 pivotally mounted at 66. As the worm-wheel rotates the shaft 14 and the parts connected therewith, including the latch 56, the latter strikes against the arm 64 and is moved backwardly against the tension of the spring 61 until it contacts with the shoulder 58. In this position the worm-wheel is no longer operatively connected with the shaft 14 so that the latter may stop while the worm wheel continues to rotate.

In order to prevent the machine overrunning, a brake 78 is provided for the shaft 14 which consists of a band surrounding an annular brake block 79 secured to the shaft by a set screw 80. Lugs 81 and 82 at each end of this band serve to carry the tightening bolt 83. The band is prevented from turning with the shaft by means of a pin 84 secured to the frame.

When it is desired to operate the machine, the bell-crank is turned so as to throw the arm 64 clear of the latch 56 and allow the spring 61 to move the latter and member 52 into engaging position.

The bell-crank 65 is arranged to be moved in one direction by a spring 67 and in the other by a foot pedal 68. The pedal 68 is secured to one end of a lever 69 pivotally mounted at 70 on a bracket 71 secured to the frame of the machine. The other end of this lever is attached by a pin and slot connection 72 to a lever 73 pivotally mounted at 74 on a bracket 75 attached to the main frame. This lever 73 is connected to the bell-crank 65 by means of a rod 76. The lower end of the spring 67 is hooked around the top end of this rod 76, while the upper end of the spring is connected to the main frame.

The operation is as follows:

The operator slips a can over the lower roll 18 until its mouth is in engagement with the support 30. At this time the parts are in the position shown in Figure 1. The pedal 68 is then depressed moving, by means of levers 69 and 73 and link 76, the bell-crank 65 until its arm 64 is clear of the latch 56. When this is accomplished the spring 61 turns the latch 56 and thereby the member 52 to couple the worm-wheel 46 to the shaft 14.

The pedal is then released and the shaft 14 makes one revolution. At the end of this revolution the latch 56 again contacts with the arm 64 and is moved so that the clutch no longer connects the worm-wheel and the shaft 14. Over-running is prevented by means of the brake 78. During the first part of this revolution the cam 19 depresses the upper roll 18 into operative contact with the can and at the end lifts it again to enable the can to be removed and another inserted in its place.

We are aware that numerous details of construction may be varied through a wide range without departing from the principles of this invention, and we therefore do not purpose limiting the patent granted otherwise than necessitated by the prior art.

We claim as our invention:

1. An embossing device for cans comprising a pair of shafts, an embossing roll on each shaft, and a circular support for the mouth of the can, the shaft carrying one of said rolls extending through said support.

2. An embossing device comprising a pair of shafts, an embossing roll on each shaft, intermeshing gears on the shafts, and means for swinging one shaft about an axis adjacent the line of engagement of the gears.

3. An embossing device for cans comprising an upper shaft and a lower shaft in substantially the same vertical plane and inclined toward each other and to the horizontal, a circular horizontal support for the mouth of the can surrounding the lower shaft, embossing rolls on the converging ends of the shafts, means for driving the lower shaft and means for varying the inclination of the upper shaft to move the rolls towards and away from each other.

4. An embossing device for cans comprising an upper shaft and a lower shaft in substantially the same vertical plane and inclined toward each other and to the horizontal, a circular horizontal support for the mouth of the can surrounding the lower shaft adapted to enter the mouth of the latter, embossing rolls on the converging ends of the shafts, means for driving the lower shaft and means for varying the inclination of the upper shaft to move the rolls towards and away from each other.

5. An embossing device comprising a pair of frames pivotally connected, a shaft journalled in each frame, an embossing roll on each shaft, a cam on one shaft, a roller on the frame carrying the other shaft adapted to engage the periphery of said cam and thereby cause the rolls to move towards and away from each other.

6. An embossing device comprising an upper frame and a lower frame pivotally connected, a shaft journalled in each frame, an embossing roll at one end of each shaft, a cam adjacent the other end of the upper shaft, a roller on the frame carrying the other shaft adapted to engage the periphery of said cam and thereby cause the rolls to move towards and away from each other, intermeshing gears on said shafts, the pivotal axis of the upper frame being adjacent the line of engagement of the gears, and means for driving the lower shaft.

7. An embossing device for cans comprising a pair of shafts, an embossing roll on each shaft, and a circular roll on each shaft, and a circular support for the mouth of the can adapted to enter the mouth of the latter, the shaft carrying one of said rolls extending through said support.

8. An embossing device for cans comprising a frame, a shaft journalled in such frame, a yoke pivotally connected to said frame, a second shaft journalled in the arms of said yoke, intermeshing gears on said shafts, the gear on said second shaft being located between the arms of said yoke and the pivotal axis of the yoke being adjacent the line of engagement of the gears, embossing rolls on said shafts and means for turning said yoke about its axis.

9. An embossing device for cans comprising a pair of shafts, an embossing roll on each shaft, a circular support for the mouth of the can adapted to enter the mouth of the latter, the shaft carrying one of said rolls extending through said support, and means for varying the position of the can on such support.

10. An embossing device comprising a support for a can to be operated upon, a shaft adapted to enter the can at an angle to its axis, an embossing roll at the end of the shaft, a second shaft adapted to assume the same angle to the axis of the can as the first shaft and an embossing roll on the second shaft adapted to contact with the exterior of the can opposite the first roll.

11. An embossing device comprising a pair of frames pivotally connected, a shaft journalled in each frame, an embossing roll on each shaft, a cam on one shaft, a roller on the frame carrying the other shaft adapted to engage the periphery of said cam, a spring for holding said can and roller in engagement whereby said rolls are caused to move towards and away from each other.

12. An embossing device comprising a pair of shafts, one embossing roll adapted to support the article to be operated upon, a second embossing roll having characters on a portion of its periphery, means for moving the second roll into contact with the article before such portion comes opposite the other roll and then moving such roll out of contact with the article after such portion has passed out of contact with the article, a member continuously rotated by a source of power and a clutch connection between said shaft and said member adapted to allow a single rotation of the rolls before disconnection.

13. An embossing device comprising a pair of shafts, an embossing roll on each shaft, intermeshing gears on the shafts, supporting means on one shaft oscillatable about an axis adjacent the line of engagement of the gears, a cam on such shaft having a depressed portion on one side, characters on that side of the embossing roll on such shaft which is opposite to the depressed portion of the cam, a member continuously rotated by a source of power and a clutch connection between said shaft and said member adapted to allow a single rotation of the rolls before disconnection.

14. An embossing device comprising a support for a can to be operated on adapted to fit the inside of the mouth of the can, a shaft passing through said support at an angle to its axis, an embossing roll at the end of the shaft and a second roll adapted to contact with the exterior of the can opposite the first roll.

15. An embossing device comprising a pair of shafts, an embossing roll on each shaft, intermeshing gears on the shafts, supporting means for one shaft oscillatable about an axis adjacent the line of engagement of the gears, a cam on such shaft having a depressed portion on one side, and characters on that side of the embossing roll on such shaft which is opposite to the depressed portion of the cam.

16. An embossing device comprising a pair of shafts, an embossing roll on each shaft, intermeshing gears on the shafts, and cam operated means for swinging one shaft about an axis adjacent the line of engagement of the gears.

In testimony whereof, we have hereunto subscribed our names in the presence of two subscribing witnesses.

LEE STURGES.
    ALBERT J. BAYLES.

Witnesses:
 FRED E. PAESLER,
 OSCAR HARTMANN.